United States Patent [19]

Lannoch

[11] 4,305,711

[45] Dec. 15, 1981

[54] CHAIN SWITCHING DEVICE

[75] Inventor: Hans-Jürgen Lannoch, Hochstetten, Fed. Rep. of Germany

[73] Assignee: Fichtel & Sachs AG, Schweinfurt, Fed. Rep. of Germany

[21] Appl. No.: 74,816

[22] Filed: Sep. 12, 1979

[30] Foreign Application Priority Data

Sep. 21, 1978 [DE] Fed. Rep. of Germany ....... 2841060

[51] Int. Cl.³ ............................................... B62M 9/12
[52] U.S. Cl. ...................................................... 474/82
[58] Field of Search ............................ 474/80, 81, 82

[56] References Cited

U.S. PATENT DOCUMENTS 4,051,738 10/1977 Dian ........................................ 474/82
4,061,048 12/1977 Huret et al. ............................ 474/82

FOREIGN PATENT DOCUMENTS 2003561 3/1979 United Kingdom .

*Primary Examiner*—C. J. Husar
*Assistant Examiner*—Conrad Berman
*Attorney, Agent, or Firm*—Toren, McGeady & Stanger

[57] ABSTRACT

A chain change gear for shifting a driving chain to engage a selected one of a set of chain wheels associated with a driven wheel such as the rear wheel of a bicycle includes an articulated lever, a guide piece and first and second joint blocks for transferring movement from the articulated lever to the guide piece. The first joint block is arranged to be fixed to the vehicle frame and the second joint block is arranged to be connected to a chain guiding and tensioning mechanism for moving the mechanism to shift the chain into engagement with the selected one of the chain wheels when the articulated lever is actuated. The guide piece has two first stub axles extending parallel to each other from opposite ends of the guide piece, and the articulated lever has two second stub axles which extend parallel to each other from opposite ends of the articulated lever. The first and second joint blocks each have a first bore for receiving a first stub axle for relative sliding movement and a second bore, extending parallel to the first bore, for receiving a second stub axle for relative pivotal movement. A fastening member extends centrally through both the guide piece and the articulated lever and parallel to the first and second stub axles for connecting the articulated lever and the guide piece together for relative pivotal movement.

10 Claims, 4 Drawing Figures

CHAIN SWITCHING DEVICE

The invention relates to a chain change gear for bicycles and the like, with a remote-controlled chain guide-or-tensioning device for shifting the chain between different chain wheels on the driven wheel of the bicycle. The chain guide-and-tensioning mechanism is secured on a movable joint head and this movable joint head is guided by an articulated lever and a guide piece on a joint head fixed on the frame. The articulated lever is connected by a first joint with the fixed joint head and by a second joint with the movable joint head. The guide piece is connected by a third joint with the fixed joint head and by a fourth joint with the movable joint head. The articulated lever is connected with the guide piece by a fifth joint. The third and fourth joints are designed as sliding joints as disclosed in Patent Application Ser. No. 936,569 filed Aug. 22, 1978, and now U.S. Pat. No. 4,231,264 issued Nov. 4, 1980. Further Ser. No. 203,969 was filed Nov. 4, 1980 as a continuation in part of Ser. No. 936,569.

Such a chain change gear is the subject matter of the older patent application Ser. No. 936,569 now known as U.S. Pat. No. 4,231,264.

The object of the present invention is to simplify this chain change gear further, particularly in terms of manufacture and assembly.

This problem is solved according to the invention in this way that the two joint heads, seen in the direction of the axes of the joints, are arranged between the articulated lever and the guide piece that the sliding joints are formed by the oblong holes in the joint heads and by axles arranged integrally on the guide that the first and second joint are formed by bores in the joint heads and by axles arranged integrally on the articulated lever, and that the articulated lever and the guide piece are held together by a central screw which forms the axle of the fifth joint.

The arrangement of axles both on the articulated lever and on the guide, which together with corresponding bores or oblong holes in the joint heads form the respective joints, as well as the connection of the articulated lever and guide piece with inclusion of the two joint heads by a single screw ensure on the one hand, a very simple and problem-free assembly of all parts of the shift mechanism. Practically only the articulated lever, the guide piece and the two joint heads have to be assembled and fixed by a central screw. After the central screw is secured, no other assembling operations are required anymore. Very simple parts can be produced by extrusion, for example, such a construction is simple to manufacture, and requires little space in its assembly, particularly in the direction perpendicularly to the axes of rotation. Such savings in space are highly desirable, since the overall width of the entire change gear can be kept small, and the gearshift parts hardly project over the bicycle.

According to the invention, it is also of advantage that the screw is arranged preferably countersunk in the guide, screwed into the articulated lever, and secured on the side of the articulated lever opposite the guide piece. By screwing the screw into the articulated lever, the play required for movement between the guide piece, articulated lever and the two joint heads, can be reduced to a minimum and be set exactly. The screw is secured preferably by a counter nut.

According to the invention, the guidepiece extends into the space between the two joint heads and has in this region, concentrically to the screw, a bore to receive a restoring spring which engages both the guide piece and the articulated lever. This permits an extremely space-saving accommodation of the restoring spring, which is thus not visible from the outside.

The articulated lever has, according to the invention, a collar directed toward the guide piece which engages the bore of the guide piece as a bearing. This bore is thus not only used to accommodate the restoring spring, it also represents in connection with the collar a bearing or a guide between the articulated lever and the guide piece. Both parts are thus guided exactly, and can not perform any tilting movements relative to each other.

Another advantage of the invention is that the two adjusting screws for fixing the two end positions of the entire change gear are arranged in the region extending into the space between the two joint heads, namely on both sides of the bore, for the restoring spring and perpendicularly to the axle of the fifth joint. Due to this arrangement, the adjusting screws are particularly easily accessible from the outside and act then either on the two joint heads or on corresponding stops of the articulated lever.

The attached figures illustrate the invention on the basis of an embodiment.

Figure 1:
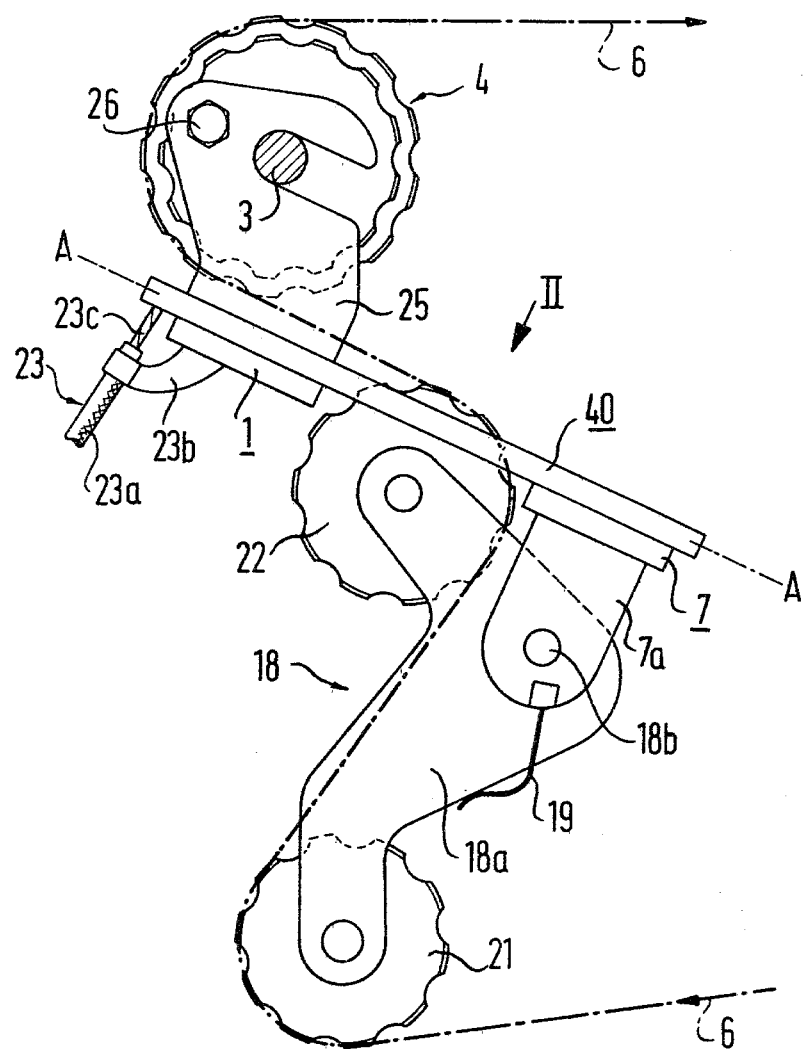
FIG. 1 shows schematically a side elevation of a chain change gear.

FIG. 1 shows only the rear wheel axle 3 of a bicycle, on which a chain wheel set 4 is rotatably mounted. On rear wheel axle 3 rests a plate 25, which is additionally secured by means of a screw 26 on the frame (not shown) of the bicycle. On plate 25 is arranged a joint head 1. This joint head 1 is connected with a joint head 7 represented schematically by a lever gear 40, represented schematically by a box. On joint head 7 is secured a carrier plate 7a. On this carrier plate 7a is mounted a carrier 18a of a chain guide-and-tensioning mechanism 18. Carrier 18a is mounted for pivotal movement about a link pin 18b. On carrier 18a are rotatably mounted a guide wheel 22 and a tensioning wheel 21. A chain 6 runs from the tread crank chain wheel (not shown) over tensioning wheel 21, guide wheel 22, and one of the chain wheels of chain wheel set 4 back to the tread crank chain wheel.

In order to be able to place chain 6 over different chain wheels of chain wheel set 4, that is for shifting, the entire chain guide-and-tensioning mechanism 18 in FIG. 1 is adjustable perpendicularly to the drawing plane in such a way that the chain guide-and-tensioning mechanism 18 remains substantially parallel to itself and to the drawing plane in an adjustment perpendicularly to the drawing plane.

The chain guide-and-tensioning mechanism 18 comprises a tension spring 19 which tries to swivel carrier 18a in FIG. 1 clockwise about swivel pin 18b. Chain 6 is thus constantly kept under tension regardless of whether it runs over a small or a larger chain wheel of chain wheel set 4.

The chain guide-and-tensioning mechanism 18 passes perpendicularly to the drawing plane of FIG. 1 through lever gear 40, which is deformable in a plane perpendicularly to the drawing plane, symbolized by the line A—A. The deformation of lever gear 40 is effected by a cable line 23 whose jacket 23a bears over an arm 23b on joint head 1 and whose cable 23c acts on lever gear 40.

The invention concerns particularly the design of lever gear 40, which is represented in FIG. 1 only schematically as a box.

Figure 2:
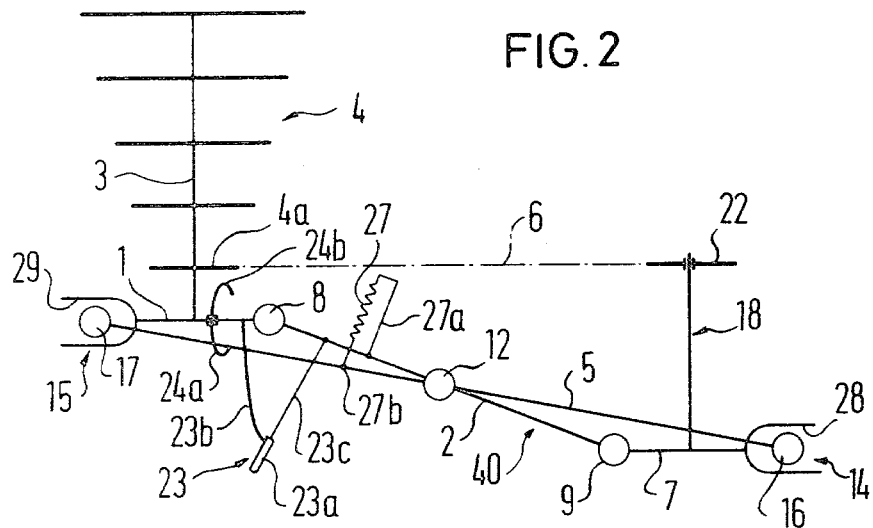
FIG. 2 shows schematically a view of the chain change gear according to the invention in the direction of arrow II of FIG. 1 in a first operating position.
Figure 3:
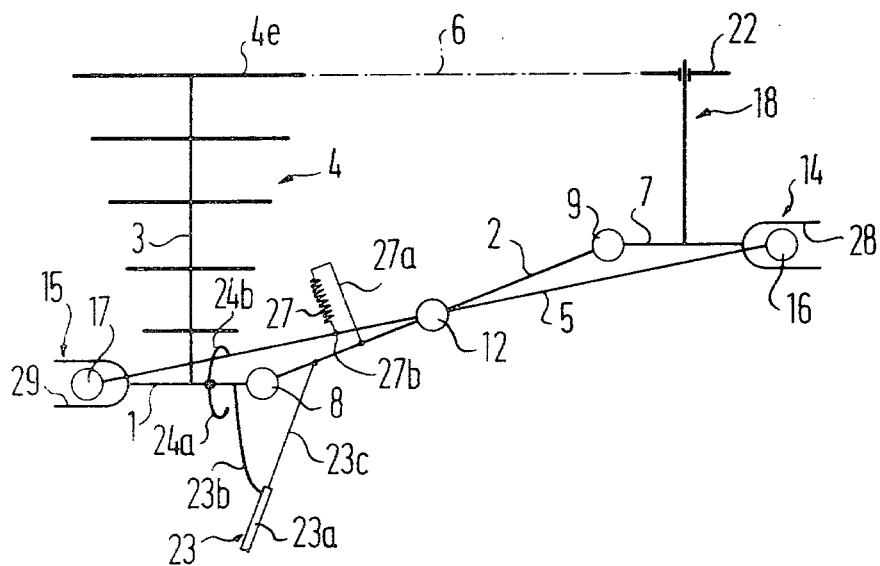
FIG. 3 shows schematically a view corresponding to that in FIG. 2 in a second operating position.

We now refer to FIGS. 2 and 3. In these figures we see again rear wheel axle 3 with chain wheel set 4, chain 6, cable line 23 with cable line jacket 23a, which is secured on joint head 1 over arm 23b, and cable 23c. Furthermore, we see joint head 7 which carries the chain guide-and-tensioning mechanism 18. For reasons of simplification, only guide wheel 22 of chain guide-and-tensioning mechanism 18 is shown. Finally, we see lever gear 40, which is deformable in the drawing plane of FIGS. 2 and 3. The drawing plane of FIGS. 2 and 3 corresponds to the line A—A in FIG. 1. In FIG. 2 the chain guide-and-tensioning mechanism 18, and thus guide wheel 22 assumes such a position that chain 6 runs over the smallest chain wheel 4a. In FIG. 3, the chain guide-and-tensioning mechanism 18, and thus guide wheel 22 assumes such a position that chain 6 runs over the largest chain wheel 4e. We see that the chain guide-and-tensioning mechanism 18 with guide wheel 22 in the position of FIG. 3 is displaced substantially parallel to itself relative to the position in FIG. 2.

We now consider lever gear 40 which is responsible for the guidance of the chain guide-and-tensioning mechanism 18 between the position in FIG. 2 and the position in FIG. 3.

This lever gear 40 comprises an articulated lever 2, which is hinged on joint head 1 by a joint 8 and on joint head 7 by a joint 9. The articulated axles of joints 8 and 9 are perpendicular to the drawing plane and thus in FIG. 1 perpendicular to plane A—A. Lever gear 40 comprises furthermore a guide piece 5 which is connected by a joint 12 with articulated lever 2. The axis of this joint 12 is in FIG. 2 perpendicular to the drawing plane and thus also perpendicular to plane A—A, in FIG. 1. Guide piece 5 is hinged with its left end in FIG. 2 by a sliding joint 15 on joint head 1 and guided for displacement. Sliding joint 15 is formed by a link pin 17 which is secured on guide piece 5 and mounted for rotation and displacement in an oblong hole 29 of jont head 1. The axis of link pin 17 extends in FIG. 2 perpendicularly to the drawing plane and thus perpendicularly to plane A—A in FIG. 1. Oblong hole 29 extends with its longitudinal direction in a plane substantially perpendicular to the rear wheel axle 3. The right end of guide piece 5 in FIG. 2 is guided by a sliding joint 14 on joint head 7. This sliding joint 14 comprises an oblong hole 28 on joint head 7 and a hinge pin 16 on guide piece 5. The axis of hinge pin 16 extends in FIG. 2 perpendicularly to the drawing plane, and thus perpendicularly to plane A—A of FIG. 1. Hinge pin 16 is rotatable in oblong hole 8 about its axis and displaceable in the longitudinal direction of oblong hole 28. The longitudinal direction of oblong hole 28 is substantially parallel to the plane of guide wheel 22. Articulated lever 2 and guide piece 5 are superposed in adjacent planes perpendicular to the drawing plane, so that they can be turned about joint 12 without hindering each other. For this reason, lever gear 40, formed of articulated lever 2 and guide piece 5, can be moved out of the position in FIG. 2 into the position of FIG. 3 and back.

The position in FIG. 2 is determined by a stop 24a. This stop 24a is secured on joint head 1. Guide piece 5 bears in the position in FIG. 2 on stop 24a. The position in FIG. 3 is determined by a stop 24b, which is likewise secured on joint head 1. In the position of FIG. 3, guide piece 5 bears on stop 24b. The two stops 24a and 24b can be designed as adjusting screws, so that the end position of lever gear 40 can be varied.

The lever gear is prestressed in the position according to FIG. 3 by a spring 27. Spring 27 is clamped between a spring support 27a and a fastening point 27b on guide piece 5 and tries therefore to bring the lever gear into the end position according to FIG. 3. In order to bring the lever gear from the end position according to FIG. 3, into the position according to FIG. 2, it is only necessary to pull cable 23c.

Instead of the schematically shown helical tension spring, 27 it is naturally also possible to wind a torsion spring about joint 12, which acts with one end on articulated lever 2 and with its other end on guide piece 5 and tries to bring articulated lever 2 and guide piece 5 into the relative position according to FIG. 3 by its torsion effect.

We see that this design of the lever gear provides a construction principle, where the projection of the lever gear perpendicularly to the chain plane is very small, which is desirable for a space-saving accommodation of the change gear on the bicycle. We also see that spring 27 is only slightly lengthened when moving from the position in FIG. 2 into the position in FIG. 3. This means that the variation of the spring force is likewise minor. This too is desirable, since it is only necessary to apply a substantially constant force on cable line 23 to move the lever gear from the position in FIG. 3 into the position in FIG. 2.

The construction described so far is the subject matter of the older patent application Ser. No. 936,569, now known as U.S. Pat. No. 4,231,264.

Figure 4:
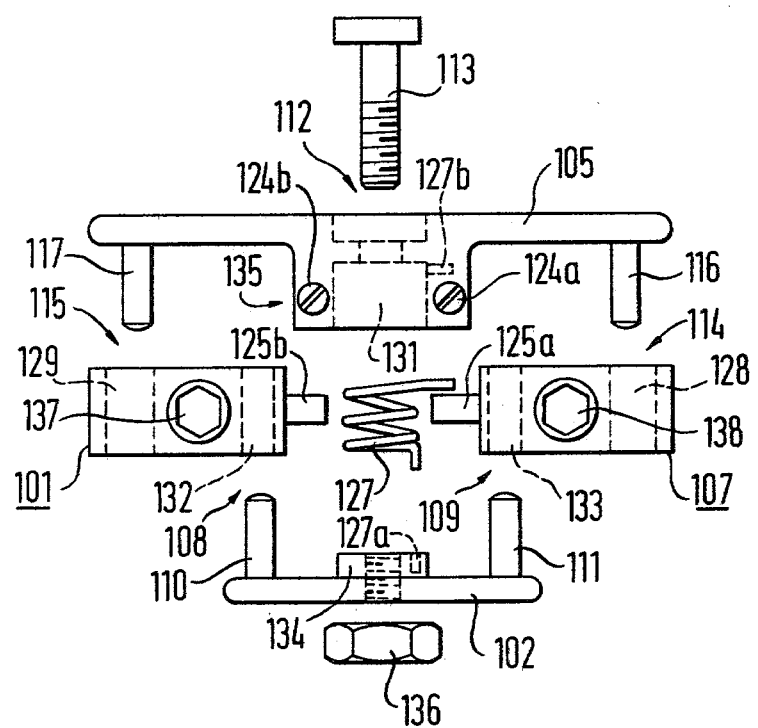
FIG. 4 shows in an exploded view the constructional design of the chain change gear according to the invention.

The essential features of the present invention result from FIG. 4. Here identical parts have been provided with the same reference numbers as in FIGS. 1 to 3, but increased by 100.

We see in FIG. 4 again the two joint heads 101 and 107, articulated lever 102, as well as guide piece 105. Both joint heads 101 and 107 have each an oblong hole 128,129 and a bore 132,133. The two bores 132 and 133 are arranged in the regions of joint 101 and 107 facing each other, and the oblong holes in the regions facing away from each other, namely parallel to each other. Into the two bores 132 and 133 extend axles 110 and 111 of articulated lever 102, which form together the joints 108 and 109. Axles 110 and 111 are here integral with articulated lever 102, e.g. by injection molding. Guide piece 105 has two axles 116 and 117, which are directed toward the two joint heads 101 and 107, as well toward articulated lever 102, and form together with oblong holes 128 and 129 the sliding joints 114 and 115. In the assembled state, guide piece 105 and articulated lever 102 are therefore so mounted, one above the other, that joint head 101 and joint head 107 are guided between the two parts by axles 116, 117 and 110, 111. Furthermore, guide piece 105 has a hub zone 135 which extends into the free space between the two joint heads 101 and 107. In this hub zone 135 of guide piece 105 is arranged a central counter-sunk screw 113 which extends with its thread into articulated lever 102. It forms together with guide piece 105 and articulated lever 102 the joint 112. Furthermore, a bore 131 is provided in hub zone 135, which receives restoring spring 127. On articulated lever 102 is arranged a collar 134 in the direction of guide piece 105, which extends into bore 131 and serves there as a bearing. The play between guide piece 105, articulated lever 102 and the two joint heads 101 and 107 is adjusted by means of central screw 113 and then fixed by a counter nut 136. Hub zone 135 of guide part 105 also receives the two adjusting screws 124a and 124b, which pass laterally by bore 131 and extend perpendicularly to joints 108 and 108. These adjusting screws 124a and 124b serve as stops to limit the maximum deflection of the entire shift mechanism. They act either on counter-stops 125a, 125b of the two joint heads 101 and 107 or on corresponding stops on articulated lever 102. Joint head 101 is provided with a screw 137 over which the entire shift mechanism is screwed on a part of the bicycle. On the other joint head 107, (not shown here specifically), the chain guide-and-tensioning mechanism is secured by a screw 138, e.g. corresponding to FIGS. 3, 4 and 5 of the parent application.

The exploded view of the shift mechanism shows a small number of details, since axles 116 and 117 are integral with guide 105, and axles 110 and 111 are integral with articulated lever 102. For the assembly, guide piece 105 and articulated lever 102 are so put together with the interposition of joint heads 101 and 107, that axles 110 and 111 are introduced into bores 132 and 133 and axles 116 and 117 into oblong holes 128 and 129. At the same time, restoring spring 127 is introduced into bore 131 and inserted with its ends into a recess 127a of articulated lever 102 and into a recess 127b of guide piece 105 and prestressed thereon. Central screw 113 holds all parts together and serves at the same time to adjust the play of all parts relative to each other. Guide piece 105 and articulated lever 102 ae each produced integral with the corresponding axles, which can be done, for example, by casting or injection molding. The special advantages of the present change gear lies in the small number of parts, the simple manufacture of the parts, the easy assembly, and the low space requirement of the assembled unit.

I claim:

1. A chain gear for shifting a driving chain to engage a selected one of a number of chain wheels associated with a driven vehicle shaft, comprising a lever gear including an articulated lever, a guide piece, first and second joint blocks and operating means for moving said articulated lever with respect to said guide piece, said first joint block being arranged to be fixed to a frame member of the vehicle with which the driven shaft is associated and said second joint block being arranged to be connected to a chain mover element for moving the chain mover element to shift the chain into engagement with the selected one of the chain wheels, when said operating means are actuated, said guide piece having a first stub axle at each of two opposite ends thereof, said first stub axles extending parallel to each other, said articulated lever having a second stub axle at each of two opposite ends thereof, said second stub axles extending parallel to each other, said first and second joint blocks each having a first recess for receiving a corresponding first stub axle to form first and second joints and a second recess extending parallel to said first recess for receiving a corresponding second stub axle to form third and fourth joints, two of said total of four first and second recesses being elongated in the transverse cross-section for permitting a sliding movement of the respective stub axles, and a fastening member extending centrally through both said guide piece and said articulated lever, said fastening member being parallel to said first and second stub axles for connecting said articulated lever and said guide piece together for relative pivotal movement to form a fifth joint so that said first and second joint blocks are arranged intermediate said articulated lever and said guide piece in the direction of the pivot axes of said joints.

2. A chain change gear according to claim 1, wherein said fastening member is a screw having a head which is countersunk in said guide piece, said screw threadedly engaging said articulated lever and being locked on the side of said articulated lever further from said guide piece.

3. A chain change gear as set forth in claim 1, wherein said chain wheels are associated with the rear wheel of a bicycle or the like.

4. A chain change gear as set forth in claim 1, wherein said first and second stub axles extend in opposite directions from said guide piece and said articulated lever respectively.

5. A chain change gear as set forth in claim 1, wherein said chain mover element is part of a chain guiding and tensioning mechanism.

6. A chain change gear as set forth in claim 1, wherein said first recesses are elongated in the transverse cross-section thereof.

7. A chain change gear according to claim 1, wherein said guide piece has a central part which extends between said first and second joint blocks, said fastening member extending through said central part of said guide piece, and including a restoring spring coupled between said guide piece and said articulated lever for urging said guide piece and said articulated lever toward a certain position relative to each other, said central part having a central bore in alignment with said fastening member for receiving said restoring spring.

8. A chain change gear according to claim 7, including a collar bearing on said articulated lever which faces toward said guide piece for engaging said central bore in said central part of said guidepiece.

9. A chain change gear according to claim 7, including two adjusting screws arranged in said central part of said guide piece on diametrically opposed sides of said central bore for fixing two end positions of said guide piece and said articulated lever relative to each other, said adjusting screws extending transversely of the axis of said fifth joint.

10. A chain change gear according to claim 9, wherein said adjusting screws cooperate with abutments provided on said first and second joint blocks.

* * * * *